United States Patent [19]

Epel

[11] Patent Number: 4,873,044
[45] Date of Patent: Oct. 10, 1989

[54] METHOD AND APPARATUS FOR REDUCTION OF MOLD CYCLE TIME

[75] Inventor: Joseph N. Epel, Southfield, Mich.

[73] Assignee: Shell Oil Company, Houston, Tex.

[21] Appl. No.: 136,061

[22] Filed: Dec. 21, 1987

[51] Int. Cl.⁴ .................. B29C 45/56; B29C 39/40
[52] U.S. Cl. .................. 264/257; 264/314;
264/328.7; 249/65; 249/82; 249/117;
425/129.1; 425/389; 425/405.1; 425/417;
425/542
[58] Field of Search ............. 264/313, 314, 315, 316,
264/241, 257, 258, 279, 279.1, 328.7, 328.8,
328.12; 425/542, 555, 117, 128, 129.1, 425.1,
417, 389; 249/65, 82, 117

[56] References Cited

U.S. PATENT DOCUMENTS

| | | | |
|---|---|---|---|
| 2,460,820 | 2/1949 | Hagopian | 264/314 |
| 2,794,233 | 6/1957 | Morton | 249/65 |
| 2,852,807 | 9/1958 | Altschuler | 249/65 |
| 3,135,640 | 6/1964 | Kepka | 264/257 |
| 3,309,450 | 3/1967 | Rodgers | 264/257 |
| 3,832,745 | 9/1974 | Dorfman | 249/65 |
| 4,116,841 | 9/1978 | Borsanyi | 264/257 |
| 4,124,678 | 11/1978 | Stroupe | 264/314 |
| 4,148,597 | 4/1979 | Larsen | 264/314 |
| 4,165,287 | 8/1979 | Goyne | 264/257 |
| 4,238,437 | 12/1980 | Rolston | 264/257 |
| 4,239,625 | 12/1980 | Hlavinka | 264/257 |

Primary Examiner—Jay H. Woo
Assistant Examiner—Jeremiah F. Durkin, II

[57] ABSTRACT

A method and apparatus are disclosed for the reduction of mold cycle time. A deflatable member is positioned flush with the surface of a mold in an opening defined downwardly therein. Prior to flow of a resin or other hardenable liquid within the mold, the deflatable member is deflated so as to define a resin flow channel across selected portions of the mold surface. Prior to hardening of the hardenable liquid within the mold, the deflatable member is inflated so as to become flush with the surface of the mold so as to yield an article of manufacture having a relatively planar surface.

2 Claims, 1 Drawing Sheet

U.S. Patent    Oct. 10, 1989    4,873,044
FIG. 1
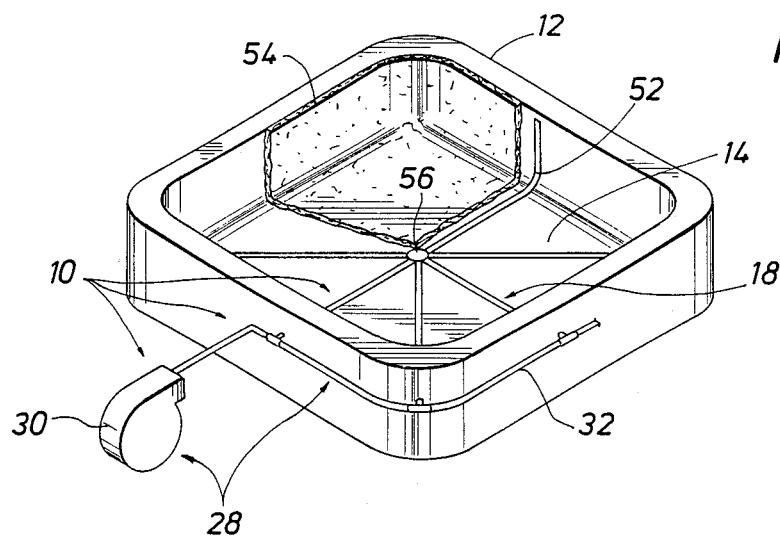
FIG. 2
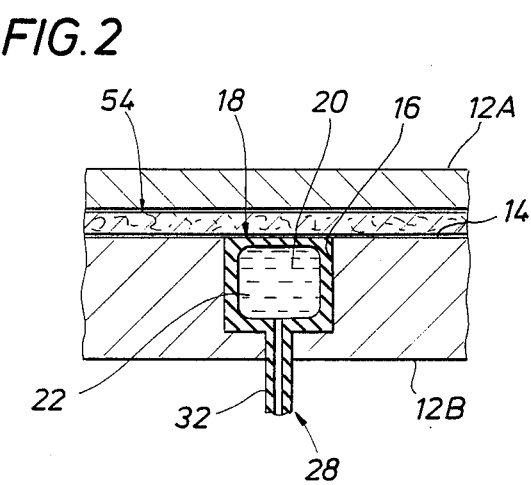
FIG. 3
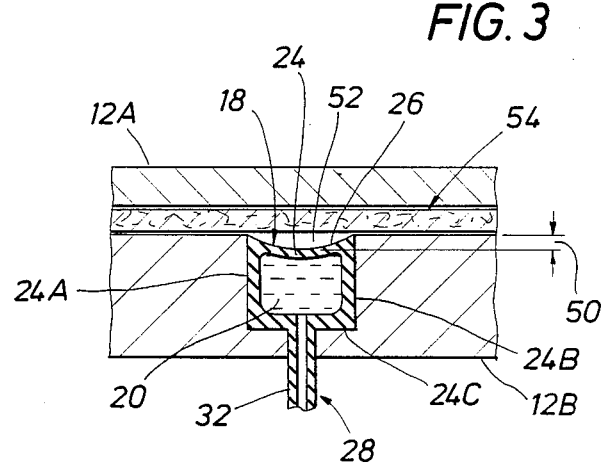
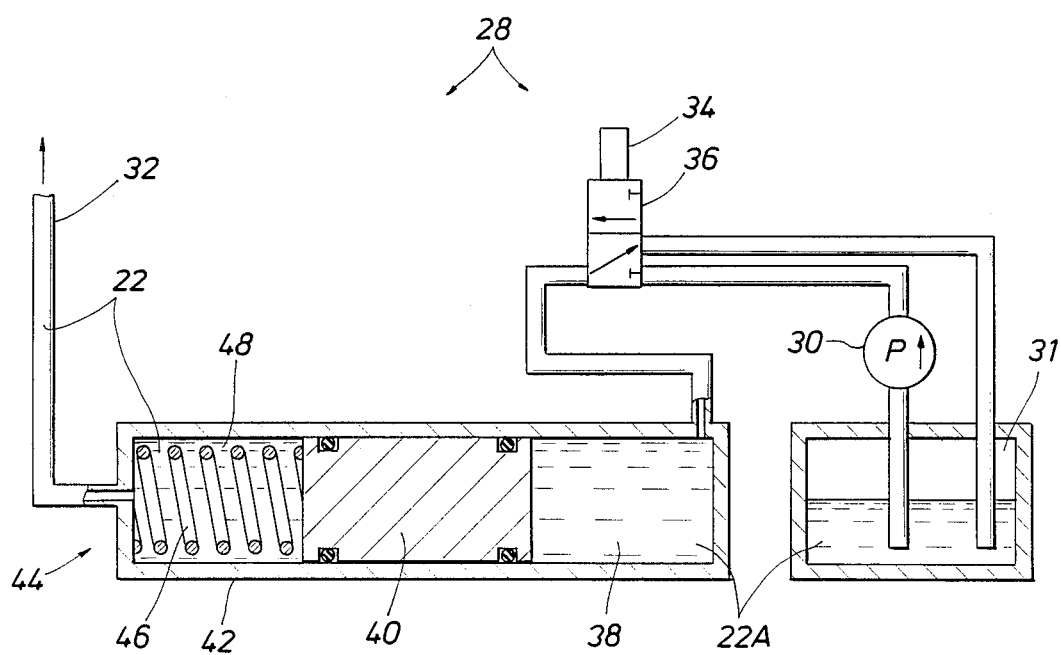
FIG. 4

METHOD AND APPARATUS FOR REDUCTION OF MOLD CYCLE TIME

BACKGROUND OF THE INVENTION

The invention relates to a method and apparatus for use in the molding of articles of manufacture, wherein a hardenable liquid forms a portion of the molded article.

Various molding methods are discussed in chapters 4 and 5 of the book entitled, *Handbook of Reinforced Plastics*, Society of the Plastics Industry, Inc., copyright 1964, published by the Reinhold Publishing Corporation, Library of Congress Catalog Card No. 64-15205. Whenever contact molding, bag molding, or similar procedures are being used to fabricate articles of manufacture formed from fiber-reinforced plastic, single die molds will typically be required. Whenever higher pressures are necessary, such as in premix or preformed molding, matched die molds will be necessary.

To economically produce these articles using any type of mold, the rate of article production must be maximized to allow the quick recovery of the capital costs associated with the purchase of the mold. The mold cycle time must be minimized.

In the case of an article that incorporates fibers of filaments within the hardenable liquid, it is desirable to quickly wet these materials. In the case of an article that is comprised entirely of a hardenable liquid, (typically a thermosetting resin), it is desirable to have the liquid quickly flood the mold cavity such that the curing time of the resin may be kept to a minimum.

A method and apparatus therefore need be developed that permits rapid flow of the resin throughout the mold and, if fibers are used to make the article, permits rapid wetting of these fibers.

SUMMARY OF THE INVENTION

In a preferred embodiment of the present invention openings are defined downwardly within a normally planar mold surface and a deflatable member is placed therein. Fluid contained within the deflatable member is removed from a fluid chamber formed within the interior thereof such that a moveable wall of the deflatable member which has a surface normally co-planar with the mold surface is drawn downwardly within the opening. Movement of the wall downwardly within the opening defines a channel for flow of a hardenable liquid, (such as a thermosetting resin), in the surface of the mold. The channel in a preferred embodiment is defined beneath fiberglass cloth, woven roving, performs, or other generally fibrous materials placed within the mold so as to insure the thorough wetting of these materials.

The resin flows faster through the liquid channel than through the fiber-packed portions of the mold. By proper placement of the liquid channels beneath the fibers, the paths of relatively slow resin flow through the fibers is minimized. The total flow time of the resin throughout the mold is thereby reduced because of the reduction in the distance that the resin has to flow through the flow impeding fibers.

Prior to hardening of the resin, fluid is reintroduced within the fluid chamber such that the moveable wall surface moves upwardly and again becomes substantially planar with the surface of the mold. In this manner a rib of hardened resin is not formed in the finished article at the location of the deflatable member. The part or article, when removed from the mold, exhibits a smooth surface.

Acceleration of portions the resin flow throughout the mold reduces the total resin fill time of the mold and allows the use of a resin having a quick curing time and therefore allows the rapid or increased production of a quantity of the articles from within the same mold.

It is therefore an object of the present invention to describe a method and apparatus for the reduction of mold cycle time.

It is a feature of the present invention to temporarily define a fluid flow channel adjacent the normal surface of the mold and to maintain that channel until a hardenable liquid such as a thermosetting resin has completely flowed throughout the mold and has thoroughly wetted any fiberglass material or fibers placed within the mold. Prior to hardening of the resin, the liquid channel is then removed by inflation of the deflatable member to an elevation common with the normal surface of the mold.

These and other features and advantages of the present invention will become apparent from the following detailed description, wherein reference is made to the Figures in the accompanying drawings.

IN THE DRAWINGS

FIG. 1 shows an isometric representation of a mold having a mold surface with channels for flow of a hardenable liquid defined therein.

FIG. 2 is a schematic representation in a side view in partial cross section showing the deflatable member positioned within an opening defined downwardly within the mold section.

FIG. 3 is a schematic representation in a side view and partial cross section of the same deflatable member now defining a channel for flow of a hardenable liquid beneath the filament matrix means.

FIG. 4 shows a schematic representation in partial cross section of the fluid movement means used to supply and/or remove fluid from within the fluid chamber of the deflatable member.

DETAILED DESCRIPTION

Referring now to FIGS. 1, 2, and 3, a molding apparatus 10 is shown, the apparatus minimizing the fabrication time of a molded article formed therein, wherein a portion of the article is formed by a hardenable liquid such as thermosetting resin.

The molding apparatus 10 can be seen to comprise a mold 12 having a surface 14 wherein the mold surface 14 can be seen to have at least one opening 16 (FIG. 2) defined downwardly therein. The mold 12, of course, is referred to in a generic sense wherein it is understood in the art to include the structures associated with vacuum bag molding, pressure bag molding, autoclave molding, vacuum injection molding, and/or cable clave molding. It should be well recognized that the mold 12 may include mold sections 12a and 12b, (FIGS. 2 and 3), in the case, for example, of matched die molding.

The mold as referred to in the present invention defines a surface of known dimensions. The teachings of the present invention therefore may be applied to accelerate the flow of a hardenable liquid about any surface of known dimensions.

The molding apparatus can also be seen to comprise deflatable member means 18 located within the opening 16, wherein the deflatable member means 18 comprise in a preferred embodiment a tube having a square cross-section made from rubber or other elastomeric material and having at least one fluid chamber 20 containing fluid 22 defined in the interior thereof. The deflatable member means 18 can be seen to have a moveable wall 24 formed between a portion of the fluid chamber 22 and a moveable wall surface 26 of the deflatable member means 18 located adjacent the mold surface 14.

The molding apparatus 10 can also be seen to include fluid movement means 28 including pump 30, and reservoir 31, (FIG. 4), that are used, along with other hydraulic components, to add and remove fluid 22 to and from the deflatable member means 18 via the main hydraulic circuit 32.

Referring now to FIG. 4, it can be seen that when solenoid 34 energizes valve means 36, pump 30 delivers fluid 22A to the pressure chamber 38, thereby causing the moveable piston 40 to slide within housing 42 of cylinder means 44 against spring 46 so as to force the fluid 22 within the pressurization chamber 48 into the main hydraulic circuit 32 and thereafter into the fluid chamber 20. It should be well recognized that many other methods and apparatus are available to add and/or remove fluid 22 from within the fluid chamber 20.

Inspection of the deflatable member means 18 shows that when fluid 22 is added and removed from the fluid chamber 20, the moveable wall 24 is caused to move outward and inward respectively. The amount of fluid removed from the fluid chamber may be measured to move the wall 24 inward a selected distance 50 relative to the mold surface 14 so as to selectively define a channel 52 of known dimensions which accelerates flow of the hardenable liquid throughout the mold 12.

As mentioned earlier, the hardenable liquid in a preferred embodiment comprises a thermosetting resin which may be selected from the group consisting of polyester resins, phenolic resins, vinyl ester resins, epoxy resins, polyurethane resins, polyisocyanurate resins, urethane resins, polyamide resins, and polyacrylamate resins, as well as any other hardenable resin(s).

The mold 12 in a preferred embodiment is sized to accept filament matrix means 54 such as fiberglass cloth, tape, woven roving, or any other collection of fibers, cloth, or material or other filament matrixes used to reinforce the resin. As can be seen from FIG. 3, the inward movement of the moveable wall 24 of the deflatable member means defines a channel 52 for accelerated flow of the hardenable liquid (resin) beneath certain portions of the filament matrix means 54. This causes the filament matrix means 54 to become rapidly wetted by the resin and thereby allows the use of a resin having a shorter curing time. Use of a resin having a shorter curing time reduces the mold cycle time.

The apparatus of the present invention allows accelerated resin flow through temporarily defined non-fiber filled channels so that the fiber packed portions of the mold can be wetted quickly. Temporary definition of the hardenable liquid channel 52 beneath the filament matrix means reduces the length of the path of slow resin flow through the fibers.

In the design of the deflatable member means 18, the moveable wall further comprises a moveable rubber-like flexible membrane wall of sufficient thickness to allow repetitive cycles of the wall 24 during the production of the articles and also of sufficient strength to resist due to any pressure differential generated across the wall between the hardenable liquid and the fluid 22 contained within the fluid chamber 20.

The moveable wall may have a preferred thickness of 0.040–0.080 inches while the other three walls 24A, 24B, 24C should preferably be thicker than wall 24 and could be 0.080–0.150 inches thick. Additionally, the wall 24 may be formed by a co-extrusion technique wherein a material such as nylon may be used to form the outer surface of the wall, to allow the wall to easily part from the finished article, since the moveable wall 24 must also withstand any withdrawal forces associated with undesirable partial bonding of the hardenable liquid to the moveable wall surface 26 after the hardenable liquid hardens.

Reduction of these removal forces may also be accomplished by coating the moveable wall surface with a parting agent such as a resinous or oil-like material including lubricants such as waxes or silicones in solvent solutions or water emulsions wiped or sprayed on the mold surface as well as the moveable wall surface 26, prior to flooding of the mold with the hardenable liquid and/or insertion of the filament matrix means 54 within the mold cavity.

The molding apparatus 10 can also be seen in a preferred embodiment to further include at least one hardenable liquid injection port 56 typically located centrally within the surface area of the mold 12. To allow the rapid acceleration of the hardenable liquid away from port 56 in a preferred embodiment, the deflatable member means 18 in a preferred embodiment extend radially outward away from the hardenable liquid injection port 56. It should be well recognized that many other flow patterns may be used to accomplish the same mechanical result. For example, the deflatable member means may comprise a series of linear fluid chambers.

In operation a mold may be fabricated wherein the surface of the mold has at least one opening 16, machined or cast downwardly therein. The deflatable member means 18 are then located within this opening and the fluid chamber 20 thereafter connected by means of the main hydraulic circuit with other portions of the fluid movement means 28 so that fluid 22 may be added and/or removed from fluid chamber 20.

Removal of fluid from the fluid chamber moves the moveable wall inward a selected distance 50 relative to the mold surface 14 so as to define the channel 52. Formation of the channel allows accelerated flow of the hardenable liquid throughout the mold 12. After the hardenable liquid has flowed throughout the mold, fluid may be added to the fluid chamber to move the moveable wall surface 26 relatively flush with the mold surface 14. The hardenable liquid is then retained within the mold for a sufficient period of time such that the liquid hardens sufficiently to dimensionally stabilize the article of manufacture. In other words, the resin hardens sufficiently to allow removal of the article of manufacture from the mold without the occurrence of undesirable dimensional changes.

In a preferred embodiment of the present invention filament matrix means 54 are positioned within the mold 12, preferably after the deflatable member means 18 are installed within the openings 14. Once the filament matrix means are placed in the mold the hardenable liquid (resin) is then flowed in an accelerated manner throughout the mold due to the existence of channels 52 which offer less resistance to flow of the resin than the included filament matrix means. In this manner the entire filament matrix may be wetted out in a timely manner so as to reduce the cycle time of the mold during the fabrication of an article.

More specifically, after the filament matrix means has been positioned in the mold, fluid is removed from the fluid chamber so as to define a channel to accelerate flow of the hardenable liquid beneath the filament matrix means. Hardenable liquid is then flowed into the mold but prior to hardening of the liquid, fluid is added to the fluid chamber to move the moveable wall surface of the moveable wall relatively flush with the mold surface. The hardenable liquid is then retained in the mold for a sufficient period for the liquid to wet the filament matrix means and to harden sufficiently to dimensionally stabilize the article of manufacture. The article of manufacture is thereafter removed from the mold.

As noted in the article "Fluid Mechanics of Mold Filling for Fiber Reinforced Plastics", by G. Q. Martin, and J. S. Son of Shell Development Company, Houston, Tex. 77070, the time for resin to flow through a mold packed with fiber reinforcement is proportional to the square of the distance the resin has to flow through the fiber reinforcement. For example, if it takes 8 seconds to flow 12" through a given fiber reinforcement, it would take 32 seconds to flow through 24" of reinforcement and 128 seconds to flow through 48" of reinforcement.

With a well distributed network of hardenable liquid channels that would fill within 1 second, and maximum flow from these channels through the fiber reinforcement, it would be possible to fill the mold in 8 seconds versus the original 128 seconds.

In another example, at even higher fiber reinforcement levels, mold fill times could be 15 seconds for 12" flow, 60 seconds for 24" flow and 240 seconds to flow 48" through the fiber reinforcement. With the inclusion of the hardenable liquid channels within the mold surface, however, it may be possible to fill the mold in 15 seconds instead of 240 seconds. One could now utilize a resin which gels in 20 seconds and cures in 60 seconds.

In accordance with the teachings of the present invention, fast gelling, fast curing resins could be used regardless of the size to the part if liquid channels were strategically placed throughout the mold such that the flow paths through the fiber reinforcement were minimized.

Many other variations and modifications may be made in the apparatus and techniques hereinbefore described by those having experience in this technology, without departing from the concept of the present invention. Accordingly, it should be clearly understood that the apparatus and methods depicted in the accompanying drawings and referred to in the foregoing description are illustrative only and are not intended as limitations on the scope of the invention.

I claim as my invention:

1. Molding apparatus for reduction in the time of fabrication of a molded article of manufacture, wherein a portion of said article is formed by a hardenable liquid, said molding apparatus comprising:

a mold having two mold section surfaces with at least one hardenable liquid injection port defined therethrough in at least one of said surfaces, said mold section surfaces sized to hold a majority of both surfaces of filament matrix adjacent said mold section surfaces, said mold section surface having at least one opening defined downwardly extending outwardly away from said hardenable liquid injection port, deflatable member means located within said opening having at least one fluid chamber containing fluid defined in the interior thereof, said deflatable member means having a thickened wall contacting the sides of said opening and a moveable wall positionable flush with one of said mold section surfaces adjacent said filament matrix, and fluid movement means placed in fluid communication with and being capable of removing a portion of said fluid from said at least one fluid chamber, said fluid when causing said moveable wall to move inward a selected distance relative to said mold section surface to define a longitudinal channel between said moveable wall and a minority of said filament matrix to accelerate flow of said hardenable liquid throughout said mold.

2. A method for reducing the fabrication time of a molded article of manufacture wherein a portion of said molded article is formed by a hardenable liquid, said method including the steps of:

providing a mold having two mold section surfaces with at least one hardenable liquid injection port defined therethrough in at least one of said surfaces, said mold section surface having at least one opening defined downwardly therein extending outwardly away from said hardenable liquid injection port, locating a deflatable member within said opening, said deflatable member having at least one fluid chamber containing fluid defined in the interior thereof, said deflatable member having a thickened wall contacting the sides of said opening and a moveable wall positionable flush with one of said mold section surfaces, placing fluid movement means in fluid communication with said at least one fluid chamber, placing a filament matrix in the mold and positioning a majority of both surfaces of said filament matrix adjacent said mold section surfaces, removing said fluid from said fluid chamber so as to move said moveable wall inward a selected distance relative to one of said mold section surfaces, thereby defining a channel to accelerate flow of portions of said hardenable liquid beneath said filament matrix means, flowing hardenable liquid into said mold, adding fluid to said fluid chamber to move said moveable wall surface flush with said mold section surface, retaining said hardenable liquid in said mold for a sufficient period for said liquid to wet said filament matrix and to harden sufficiently to dimensionally stabilize said article of manufacture, and removing said article of manufacture from said mold.

* * * * *